United States Patent
Argyropoulos et al.

(10) Patent No.: US 8,889,818 B2
(45) Date of Patent: Nov. 18, 2014

(54) CROSSLINKABLE COMPOSITION AND METHOD OF PRODUCING THE SAME

(71) Applicants: Rohm and Haas Company, Philadelphia, PA (US); Dow Global Technologies LLC, Midland, MI (US)

(72) Inventors: John N. Argyropoulos, Midland, MI (US); Paul Foley, Traverse City, MI (US); Eric Greyson, Blue Bell, PA (US); Jeff R. Anderson, Midland, MI (US); Gary E. Spilman, Midland, MI (US); Caroline Slone, Maple Glen, PA (US); Nahrain E. Kamber, Penllyn, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/727,963

(22) Filed: Dec. 27, 2012

(65) Prior Publication Data

US 2013/0165581 A1   Jun. 27, 2013

Related U.S. Application Data

(63) Continuation-in-part of application No. 13/160,604, filed on Jun. 15, 2011, now Pat. No. 8,653,174.

(60) Provisional application No. 61/355,266, filed on Jun. 16, 2010.

(51) Int. Cl.
| | |
|---|---|
| C08G 12/02 | (2006.01) |
| C08G 14/00 | (2006.01) |
| C08F 283/02 | (2006.01) |
| C08G 63/12 | (2006.01) |
| C09J 133/06 | (2006.01) |
| C08F 22/10 | (2006.01) |

(52) U.S. Cl.
CPC ............... *C08F 22/10* (2013.01); *C08G 63/12* (2013.01); *C08L 2312/00* (2013.01); *C09J 133/066* (2013.01)
USPC ........................... 528/245; 525/465; 525/472

(58) Field of Classification Search
USPC ................. 525/402, 472, 154, 465, 456, 441; 528/245, 242
See application file for complete search history.

(56) References Cited

U.S. PATENT DOCUMENTS

| | | | | |
|---|---|---|---|---|
| 3,208,963 | A | * | 9/1965 | Jasinski ........................ 524/558 |
| 4,245,110 | A | * | 1/1981 | Engelhard et al. ............ 560/160 |
| 4,277,417 | A | * | 7/1981 | Varma ............................. 558/46 |
| 4,533,704 | A | * | 8/1985 | Alexander et al. ........ 525/440.06 |
| 4,812,589 | A | * | 3/1989 | Prater et al. ..................... 558/51 |
| 5,155,170 | A | * | 10/1992 | Baukema et al. ............. 525/154 |
| 5,336,566 | A | | 8/1994 | Rehfuss |
| 5,356,669 | A | * | 10/1994 | Rehfuss et al. ............ 427/407.1 |
| 6,177,514 | B1 | | 1/2001 | Pathak et al. |
| 6,252,121 | B1 | | 6/2001 | Argyropoulos et al. |
| 6,541,594 | B2 | | 4/2003 | Ohrbom et al. |
| 6,962,730 | B2 | | 11/2005 | Ohrbom et al. |
| 7,442,325 | B2 | | 10/2008 | Lin et al. |
| 2006/0155095 | A1 | | 7/2006 | Daussin et al. |
| 2010/0179272 | A1 | | 7/2010 | Balzarek et al. |
| 2010/0256292 | A1 | | 10/2010 | Jakob et al. |

FOREIGN PATENT DOCUMENTS

| | | | |
|---|---|---|---|
| KR | 20010063666 A * | 7/2001 | |
| WO | 9529947 A1 | 11/1995 | |
| WO | WO 9812237 A1 * | 3/1998 | |
| WO | 2009/009271 A2 | 1/2009 | |

OTHER PUBLICATIONS

RJ 100 CAS Record.*
Bruno (Thermal Properties of insolubilized polyacetal derived from non-formaldehyde crosslinking agents, Thermochimica Acta, 243 155-159, Sep. 1994).*

* cited by examiner

*Primary Examiner* — Randy Gulakowski
*Assistant Examiner* — Christopher M Rodd

(57) ABSTRACT

The instant invention provides crosslinkable compositions, and method of producing the same. The non-aqueous single phase crosslinkable composition comprises: (a) a polyol having an average of 2 or more hydroxyl functional groups; (b) polyaldehyde, or acetal or hemiacetal thereof; and (c) an acid catalyst having pK of less than 6; and (d) optionally one or more organic solvents.

52 Claims, No Drawings

CROSSLINKABLE COMPOSITION AND METHOD OF PRODUCING THE SAME

CROSS-REFERENCE TO RELATED APPLICATIONS

The present application is a continuation-in-part application of the U.S. application Ser. No. 13/160,604, filed on Jun. 15, 2011, entitled "AMBIENT TEMPERATURE CURABLE ISOCYANATE-FREE COMPOSITIONS FOR PREPARING CROSSLINKABLE POLYURETHANES," the teachings of which are incorporated by reference herein, as if reproduced in full hereinbelow, which claims priority from the U.S. Provisional Application No. 61/355,266, filed on Jun. 16, 2010, entitled "AMBIENT TEMPERATURE CURABLE ISOCYANATE-FREE COMPOSITIONS FOR PREPARING CROSSLINKABLE POLYURETHANES," the teachings of which are incorporated by reference herein, as if reproduced in full hereinbelow.

FIELD OF INVENTION

The instant invention relates to crosslinkable compositions, and method of producing the same.

BACKGROUND OF THE INVENTION

Low molecular polymers (Mn of 500-10,000) containing hydroxyl-functionality (also referred to as polyols) are widely used in coating applications and are cured at room temperature or elevated temperatures using a variety of crosslinking technologies. The most typical crosslinkers are polyisocyanates and aminoplast resins. Polyisocyanate crosslinkers offer the advantages of low temperature cure and provide coatings with superior properties, but suffer from high toxicity, high cost and the limitation of balancing pot life with dry time. Aminoplast resins are often used as crosslinkers because they offer a good balance of lower cost and good coating performance, but curing at higher temperature is often required and they suffer from the toxicity of residual formaldehyde.

Accordingly there is a need for a new crosslinking technology under ambient conditions (or low temperature bakes, e.g. 60° C.). Furthermore there is need for coating properties when coating compositions are crosslinked while maintaining lower levels of toxicity.

SUMMARY OF THE INVENTION

The instant invention provides crosslinkable compositions, and method of producing the same.

In one embodiment, the instant invention provides a non-aqueous single phase crosslinkable composition comprising: (a) a polyol having an average of 2 or more hydroxyl functional groups; (b) polyaldehyde, or acetal or hemiacetal thereof; and (c) an acid catalyst having a pK of less than 6; and (d) optionally one or more organic solvents.

In an alternative embodiment, the instant invention further provides a process for producing a crosslinkable composition comprising: (1) selecting a polyol having an average of 2 or more hydroxyl functional groups; (2) selecting a polyaldehyde, or acetal or hemiacetal thereof; and (3) selecting an acid catalyst having pK of less than 6; and (4) optionally selecting one or more organic solvents; (5) admixing said components 1-4; (6) thereby producing said crosslinkable composition. In another alternative embodiment, the instant invention further provides a crosslinked composition comprising the crosslinked product of the crosslinkable composition.

In another alternative embodiment, the instant invention further provides a coating layer comprising the crosslinked composition.

In another alternative embodiment, the instant invention further provides an article comprising a substrate and one or more inventive coating layers according associated at least with one or more surface of said substrate.

In an alternative embodiment, the instant invention provides a crosslinkable composition, method of producing the same, in accordance with any of the preceding embodiments, except that the crosslinkable composition is capable of reacting to cure at a temperature of from 0° C. to less than 120° C. to form a crosslinked composition.

In an alternative embodiment, the instant invention provides a crosslinkable composition, method of producing the same, in accordance with any of the preceding embodiments, except that the polyol is an acrylic, styrene-acrylic, styrene-butadiene, saturated polyester, urethane, alkyd, polyether or polycarbonate.

In an alternative embodiment, the instant invention provides a crosslinkable composition, method of producing the same, in accordance with any of the preceding embodiments, except that the polyol comprises one or more additional crosslinking functional groups.

In an alternative embodiment, the instant invention provides a crosslinkable composition, method of producing the same, in accordance with any of the preceding embodiments, except that the one or more additional crosslinking functional groups are capable of being crosslinked with the polyaldehyde.

In an alternative embodiment, the instant invention provides a crosslinkable composition, method of producing the same, in accordance with any of the preceding embodiments, except that the polyol comprises 1,2 or 1,3 OH functional groups, as shown in figures below:

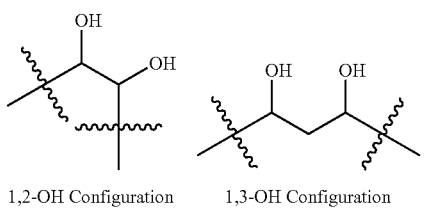 [SMILES: *C(O)C(*)O ; *C(O)CC(*)O]

1,2-OH Configuration     1,3-OH Configuration

In an alternative embodiment, the instant invention provides a crosslinkable composition, method of producing the same, in accordance with any of the preceding embodiments, except that the polyaldehyde has from 2 to 20 carbon atoms.

In an alternative embodiment, the instant invention provides a crosslinkable composition, method of producing the same, in accordance with any of the preceding embodiments, except that the polyaldehyde has greater than 20 carbon atoms, with the proviso that a polyaldehyde having greater than 20 carbon atoms has at least one aldehyde group for at least every 10 carbon atoms.

In an alternative embodiment, the instant invention provides a crosslinkable composition, method of producing the same, in accordance with any of the preceding embodiments, except that the polyaldehyde is selected from the group consisting of (cis,trans)-1,4-cyclohexanedicarboxyaldehydes, (cis,trans)-1,3-cyclohexanedicarboxyaldehydes, pentane-1, 5-dial, ethane-1,2-dial, and mixtures thereof.

In an alternative embodiment, the instant invention provides a crosslinkable composition, method of producing the same, in accordance with any of the preceding embodiments, except that the acid catalyst has a pKa of less than 4.0.

In an alternative embodiment, the instant invention provides a crosslinkable composition, method of producing the same, in accordance with any of the preceding embodiments, except that the acid catalyst has a pKa of less than 2.0

In an alternative embodiment, the instant invention provides a crosslinkable composition, method of producing the same, in accordance with any of the preceding embodiments, except that the acid catalyst is a Lewis acid.

In an alternative embodiment, the instant invention provides a crosslinkable composition, method of producing the same, in accordance with any of the preceding embodiments, except that the acid catalyst is a functional group on backbone of the polyol.

In an alternative embodiment, the instant invention provides a crosslinkable composition, method of producing the same, in accordance with any of the preceding embodiments, except that the composition further comprises a curing inhibitor comprising alcohol.

In an alternative embodiment, the instant invention provides a crosslinkable composition, method of producing the same, in accordance with any of the preceding embodiments, except that the alcohol is selected from the group consisting of ethanol, 1-propanol, 1-butanol, 1-pentanol, ethylene glycol monoalkyl ethers, diethylene glycol monoalkyl ethers, propylene glycol monoalkyl ethers and dipropylene glycol monoalkyl ethers.

DETAILED DESCRIPTION OF THE INVENTION

The instant invention provides to crosslinkable compositions, and method of producing the same.

In one embodiment, the instant invention provides a non-aqueous single phase crosslinkable composition comprising: (a) a polyol having an average of 2 or more hydroxyl functional groups; (b) polyaldehyde, or acetal or hemiacetal thereof; and (c) an acid catalyst having pK of less than 6; and (d) optionally one or more organic solvents.

Polyol Component

The polyol component may be any polyol; for example, the polyol component may be selected from the group ocnising of an acrylic, styrene-acrylic, styrene-butadiene, saturated polyester, urethane, alkyd, polyether or polycarbonate. In one embodiment, the polyol component comprises one or more additional crosslinking functional groups. Such crosslinking functional groups include, but are not limited to, ureas, carbamates, and/or mercaptans. In one embodiment, the one or more additional crosslinking functional groups are capable of being crosslinked with the polyaldehyde component. In one exemplary embodiment, the polyol component comprises 1,2 or 1,3 OH functional groups. The crosslinkable composition may comprise from 10 to 90 percent by weight of the polyol component; for example, from 30 to 70 percent by weight of the polyol component. In one embodiment, the polyol has a functional structure of a 1,2-diol, 1,3-diol, or combinations thereof.

The polyol of the first component of the present invention may have an average of 2.0 or more hydroxyl groups, or an average of three or more hydroxyl groups, or an average of four or more hydroxyl groups. As used herein, the term "average number of hydroxyl groups" means the total number average molecular weight of the polyol as determined by gel permeation chromatography divided by the hydroxyl equivalent weight of the polyol, i.e. 56,100 mg KOH/mole KOH divided by the hydroxyl number in mg KOH/g resin.

The polyol can be acyclic, straight or branched; cyclic and nonaromatic; cyclic and aromatic, or a combination thereof. In some embodiments the polyol comprises one or more acyclic, straight or branched polyols. For example, the polyol may consist essentially of one or more acyclic, straight or branched polyols.

Preferably the polyol consists essentially of carbon, hydrogen, and oxygen atoms. Still more preferably the polyol consists of primary hydroxyl groups and most preferably the hydroxyl groups are in the 1,2 and/or 1,3 configuration. Some preferred polyol structures are shown below for illustrative purposes. Without being bound by theory, it is expected that polyols containing hydroxyl groups in these preferred configurations will lead to more efficient crosslinking with aldehydes due to the formation of stable five or six membered rings.

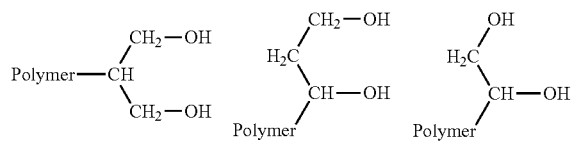

Polyaldehyde Component, or Acetal or Hemiacetal Thereof;

The crosslinkable composition comprises a polyaldehyde component, or acetal or hemiacetal thereof. In one embodiment, the polyaldehyde component comprises from 2 to 20 carbon atoms. In another alternative embodiment, the polyaldehyde comprises greater than 20 carbon atoms, with the proviso that a polyaldehyde having greater than 20 carbon atoms has at least one aldehyde group for at least every 10 carbon atoms. The crosslinkable composition may comprise from 2 to 50 percent by weight of the polyaldehyde component or acetal or hemiacetal thereof; for example, from 5 to 25 percent by weight of the polyaldehyde component or acetal or hemiacetal thereof. In one embodiment, the polyaldehyde is selected from the group consisting of (cis,trans)-1,4-cyclohexanedicarboxyaldehydes, (cis,trans)-1,3-cyclohexanedicarboxyaldehydes, pentane-1,5-dial, ethane-1,2-dial, and mixtures thereof.

For example, the polyaldehyde component may have two aldehyde groups (also referred to herein as a dialdehyde), wherein at least one of the two aldehyde groups reacts with two hydroxyl groups from the same polyolchain (molecule) so as to form the crosslinked composition. The two aldehyde groups of the dialdehyde may react with two hydroxyl groups from two different polyol chains so as to form the crosslinked composition. Suitable polyaldehydes of the present invention have two, three, four or more aldehyde groups. A polyaldehyde having three aldehyde groups is also referred to herein as a trialdehyde.

The polyaldehyde component can include any such molecule having from 2 to 20 carbon atoms or it can have more than 20 carbon atoms, i.e, up to 100, with the proviso that polyaldehydes having more than 20 carbon atoms will have at least one aldehyde group for every 11 carbon atoms, for example, at least one aldehyde group for every 10 carbon atoms. The polyaldehyde can be a cyclic, straight or branched; cyclic and nonaromatic; cyclic and aromatic (e.g., 3-formylbenzaldehyde), or a combination thereof.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, preferably, less than 300 ppm, or, more preferably, less than 200 ppm. The compositions of the present invention contain so little of resins made from formaldehyde, such as aminoplasts and phenol or resole formaldehyde condensates, that the amount of free formaldehyde in such compositions meets the definition of "substantially formaldehyde free".

Preferably, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 3 to 20 ring carbon atoms.

More preferably, each cyclic, nonaromatic polyaldehyde in the inventive crosslinkable composition independently has from 5 to 12 ring carbon atoms, and, even more preferably, is a mixture of (cis,trans)-1,4-cyclohexanedicarboxyaldehydes and (cis,trans)-1,3-cyclohexanedicarboxyaldehydes.

According to the present invention, the polyaldehyde may comprise one or more acyclic, straight or branched polyaldehyde having from 2 to 16 carbon atoms.

In another embodiment, each of the one or more acyclic, straight or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde. The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described later. The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde. The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde. The 3-(3-formylcyclohexyl)propanal; 3-(4-formylcyclohexyl)propanal; 2-(3-formylcyclohexyl)propanal; and 2-(4-formylcyclohexyl) propanal can be prepared by a process comprising hydroformylating vinyl cyclohexene. The cyclododecane-1,4,8-tricarbaldehyde can be prepared by a process comprising trimerizing 1,3-butadiene to give 1,4,8-cyclododecatriene, and hydroformylating the 1,4,8-cyclododecatriene.

The polyaldehyde of the present invention can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group ($>C(OH)_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. Preferably the hydroformylating step is performed in a manner as generally described in U.S. Pat. No. 6,252,121 B1, which describes an improved separation process.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde in the invention multi-component composition. In such embodiments, the invention process of preparing the invention crosslinked composition can employ the protected polyaldehyde in place of or in addition to the polyaldehyde and the process can comprise curing the polyol directly with the protected polyaldehyde or the process can optionally further comprise a step of deprotecting the protected polyaldehyde so as to obtain the polyaldehyde in situ, and curing the same with the polyol first component, as described herein.

Preferably, the polyaldehydes of the present invention are mixtures comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

Acid Catalyst;

The acid catalyst component may be any acid catalyst suitable for promoting the reaction between the carbamate functional and the polyaldehyde component. In one embodiment, the acid catalyst may be a Lewis acid. In another embodiment, the acid catalyst may be a protic acid. In one embodiment, the acid catalyst has a pKa of less than 6.0, or in the alternative, a pKa of less than 4.0. In another embodiment, the acid catalyst is a functional group on the backbone of the polyol component.

Preferably in the present invention, the curing temperature of the ambient temperature curable composition is 120° C. or lower, more preferably 80° C. or lower, still more preferably 60° C. or lower, and even more preferably 40° C. or lower. A preferred minimum effective curing temperature is a minimum temperature effective for curing the invention ambient temperature curable composition to yield the invention crosslinked composition within 7 days. The curing step of the invention process employing the invention ambient temperature curable composition remarkably can be performed at ambient temperature (i.e., 60° C. or lower). In some embodiments the ambient temperature for curing is at least 0° C., in some embodiments at least 10° C., and in some embodiments at least 20° C. In some embodiments the ambient temperature for curing is 50° C. or less, in some embodiments 40° C. or less, in some embodiments 35° C. or less, and in some embodiments 30° C. or less. A preferred ambient temperature for curing is from 19° C. to 29° C.

Despite curing the invention ambient temperature curable composition at ambient temperature, the invention process prepares the invention crosslinked composition within a curing time period of 7 days or shorter. In some embodiments the ambient temperature curable composition is cured for a curing time period of 5 days or shorter, more preferably 24 hours or shorter, still more preferably 12 hours or shorter, even more preferably 1 hour or shorter. Such short curing time periods are remarkable for an ambient temperature curing step.

Preferably a crosslinked composition prepared according to the present invention forms a coating that exhibits good to excellent cross-hatch adhesion, water resistance, resistance to rubbing with methyl ethyl ketone, high pendulum hardness, or a combination of any two or more thereof.

Preferably, the curing step of the invention process does not generate a reaction byproduct that is a volatile organic compound (VOC). Preferably, the methods of the present invention further comprise drying the cross-linked composition so as to remove at least 80 weight percent (wt %), preferably at least 90 wt %, and more preferably 95 wt % of the water byproduct, thereby preparing a dried crosslinked composition.

Preferably, the crosslinked composition of the present invention is, a water resistant crosslinked composition. Still further, the crosslinked composition may be resistant to deterioration by an organic solvent (e.g., methyl ethyl ketone (MEK)).

The invention curing step preferably is initiated by an acid catalyst, also refered to herein as a triggering agent, triggering event, or a combination thereof. Such initiation is performed by beginning exposure of the invention crosslinkable composition to the triggering event, triggering agent, or combination thereof; and continuing such exposure for a period of time sufficient to produce the invention crosslinked composition. An example of the triggering event is heat. Preferably heat is applied radiantly although other means such as by convection or combinations of means can be used. Preferably, the triggering agent is used in an amount of from 0.001 wt % to 10 wt % of the multicomponent composition, based on the total weight of solids in the composition, more preferably from 0.01 wt % to 5 wt % thereof, or, preferably from 0.1 wt % to 2 wt % thereof. Such amounts of the triggering agent are referred to herein as "effective amounts" of the triggering agent.

Any compound, substance or material suitable for increasing a rate of reaction of a hydroxyl group (—O—H) with an aldehyde group (—C(=O)H) can be employed as the triggering agent. Examples of triggering agents are Lewis acids (e.g., boron trifluoride etherate) and protic acids (i.e., Brønsted acids). Preferably, the triggering agent comprises a protic acid characterizable as having a $pK_a$ of 6 or lower, wherein $pK_a$ is negative base-10 logarithm of acid dissociation constant, $K_a$, of the protic acid. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are $AlCl_3$; benzyltriethylammonium chloride (TEBAC); $Cu(O_3SCF_3)_2$; $(CH_3)_2BrS^+Br^-$; $FeCl_3$ (e.g., $FeCl_3.6H_2O$); $HBF_4$; $BF_3.O(CH_2CH_3)_2$; $TiCl_4$; $SnCl_4$; $CrCl_2$; $NiCl_2$; and $Pd(OC(O)CH_3)_2$.

The triggering agent can be unsupported (no solid support) or supported, i.e. covalently bonded to a solid support. Examples of supported triggering agents are supported curing catalysts such as supported acid catalysts such as acid ($H^+$) forms of cation exchange-type polymer resins (e.g., ethanesulfonic acid, 2-[1-[difluoro[(1,2,2-trifluoroethenyl)oxy]methyl]-1,2,2,2-tetrafluoroe thoxy]-1,1,2,2-tetrafluoro-, polymer with 1,1,2,2-tetrafluoroethene sold under trade name NAFION NR 50 (E. I. du Pont de Nemours & Co., Inc., Wilmington, Del.) and ethenylbenzenesulfonic acid polymer with diethenylbenzene sold as AMBERLYST™ 15 (Rohm and Haas Co., subsidiary of The Dow Chemical Company, Midland, Mich., USA.).

To form the ambient temperature curable composition of the present invention, a polyaldehyde component, an effective amount of a triggering agent and a polyol component are mixed together.

Organic Solvents(s)

The crosslinkable composition may comprise from 5 to 90 percent by weight of one or more solvents; for example, from 20 to 70 percent by weight of one or more solvents. Solvents may be needed for reducing the viscosity of the crosslinkable composition to facilitate application to a substrate. Solvents may also be required to maintain all the components of the crosslinkable composition in one single phase. Such solvents include, but are not limited to, organic solvents. Exemplary solvents include, but are not limited to, ethanol, ethylene glycol monoalkyl ethers, diethylene glycol monoalkyl ethers, propylene glycol monoalkyl ethers and dipropylene glycol monoalkyl ethers.

Alternative examples of suitable organic solvents are non-polar or polar organic solvents such as, for example, an alkane (e.g., a ($C_6$-$C_{12}$)alkane), ether (e.g., ($C_2$-$C_{12}$)ether, e.g., a ($C_2$-$C_{12}$)dialkyl ether), carboxylic ester (e.g., a ($C_2$-$C_{12}$)carboxylic ester), ketone (e.g., a ($C_3$-$C_{12}$)ketone), secondary or tertiary carboxamide (e.g., a secondary or tertiary ($C_3$-$C_{12}$) carboxamide), sulfoxide (e.g., a ($C_2$-$C_{12}$)sulfoxide), or a mixture of two or more thereof.

Though the inventive composition is a non-aqueous composition, small amounts of water may be used as a solvent or additive, provided that the amount of water does not result in a two-phase composition. Preferably, water is present at a concentration of at most 20 wt %, based on the total weight of solids in the composition, or more preferably, at most 10 wt %, and, still more preferably, at most 5 wt %.

Other Components;

In one embodiment, the crosslinkable composition comprises one or more curing inhibitor agents. Such curing inhibitor agents are generally known to a person of ordinary skill in the art. Exemplary curing inhibitor agents include, but are not limited to alcohols and water.

The crosslinkable composition may comprise from 0.5 to 50 percent by weight of the one or more curing inhibitor agents; for example, from 2 to 20 percent by weight of the curing inhibitor agents.

Curing inhibitors may include, for example, alkanols, water, or mixtures thereof, or, more preferably, primary alkanols. Preferably, the alkanol is present at a concentration of from 0.5 wt % to 50 wt %, based on the total weight of solids in the composition, or more preferably, at most 30 wt %, and, still more preferably, at most 20 wt %. More preferably, the alkanol concentration is at least 1 wt %, based on the total weight of solids in the composition, and still more preferably at least 2 wt %. Preferably, water is present at a concentration of at most 20 wt %, based on the total weight of solids in the composition, or more preferably, at most 10 wt %, and, still more preferably, at most 5 wt %.

Exemplary pigments include, but are not limited to, $TiO_2$, lamp black, talc, calcium carbonate, and clay.

The crosslinkable composition of the present invention may lack the dehydrating agent, or they may lack the dispersion medium, or they may lack the surfactant, or they may lack the dispersing agent, or they may lack the wetting agent, or they may lack the adhesion promoter, or they may lack the UV light absorber, or they may lack the light stabilizer, or they may lack the colorant or dye, or they may lack the antioxidant.

The crosslinked compositions of the present invention, even those produced by curing at room temperature, have a high degree of crosslinking. This high degree of crosslinking preferably is evidenced by their a spectral property (e.g., obtained from proton-nuclear magnetic resonance ($^1$H-NMR) spectroscopy, $^{13}$C-NMR spectroscopy, or FT-IR spectroscopy) or, more preferably, by one or more improved performance properties. Preferably at least one of the improved performance properties is cross-hatch adhesion, water resistance, deterioration resistance to methyl ethyl ketone rubs, or high pendulum hardness.

Preferably, methods of using the crosslinked compositions of the present invention comprise coatings formed with the crosslinkable compositions, wherein the coating exhibits a water resistance, resistance to rubbing with methyl ethyl ketone, high pendulum hardness, cross-hatch adhesion, or a combination of any two or more thereof.

An adhesive composition of the present invention may comprise the inventive crosslinked compositions, which is disposed between and in independent operative contact with at least a portion of each of two substrates capable of being adhered to each other.

The coating composition of the present invention comprises a layer of the inventive crosslinked composition, which is in coating operative contact to at least a portion of a substrate capable of being coated.

The inventive coated substrate can be prepared by any suitable method. For example, in a method of coating a surface of a substrate, the method comprises applying invention ambient temperature curable composition to at least a portion of the surface of the substrate and curing the curable coating of the ambient temperature curable composition of the composite material at a curing temperature of 80° C. or less, or, for example, 30° C. or less, so as to prepare a coated substrate comprising a crosslinked composition.

Preferably, the inventive coating exhibits a pendulum hardness in seconds of 30 or greater, more preferably, 50 or greater, still more preferably, 80 or greater, and even more preferably, 100 or greater.

Preferably, the coatings of the present invention exhibit resistance to organic solvent, i.e., methyl ethyl ketone (MEK) back-and-forth double rubbing (i.e., one rub back, one rub forth equals one double rub) of 30 or greater, more preferably, 50 or greater, still more preferably, 70 or greater, even more preferably, 100 or greater, and yet more preferably, greater than 200 (>200). Such organic solvent resistance is evidence of crosslinking to form a crosslinked composition.

Preferably, the inventive coating exhibits water resistance of from 2 to 6, more preferably from 3 to 6, still more preferably from 4 to 6, even more preferably from 5 to 6, and yet more preferably 6. These values are described later.

Preferably, the inventive coating exhibits a cross-hatch adhesion value of from 1B to 5B, more preferably from 2B to 5B, still more preferably from 3B to 5B, even more preferably from 4B to 5B, and yet more preferably 5B.

In determining any one or more of the aforementioned pendulum hardness, number of MEK double rubs (back-and-forth), and cross-hatch adhesion values, the coating is formed on a steel substrate as described herein. In determining water resistance values, the coating is formed on a steel or poplar wood substrate as described herein. Preferably the invention coating so formed has a thickness, as measured as described later, of from 10 micrometers (μm) to 70 μm, more preferably 50 μm or less, still more preferably less than 40 μm, and even more preferably less than 30 μm. In some embodiments the invention coating so formed has a thickness of 14 μm or greater, and still more preferably 20 μm or greater.

The crosslinked composition of the present invention may comprise a sealant, which is disposed in sealing operative contact to a substrate capable of being sealed. Preferably the inventive sealant prevents or inhibits passage of a liquid or gas, dust or smoke; more preferably a liquid or gas; still more preferably a liquid, and even more preferably water. In some embodiments the sealant further comprises an inert filler material (e.g., inert finely-divided powder). In methods of using the sealants of the present invention, sealed substrates can be prepared by any suitable method. For example, a method of sealing a substrate comprises contacting the invention ambient temperature curable composition to at least a portion of the substrate to yield a composite material comprising a curable coating of the ambient temperature curable composition in operative contact with at least the portion of the substrate; and curing the curable coating of the ambient temperature curable composition of the composite material at a curing temperature of from 0° C. to less than 80° C. so as to prepare a sealed substrate comprising a sealant layer of the invention crosslinked composition in sealing operative contact to at least the portion of the substrate. For example, the curable composition may be cured at a curing temperature of 30° C. or less.

The inventive ambient temperature curable composition can be applied to the surface of the substrate(s) by any suitable applying means such as, for example, brushing, calendaring, rolling, spraying, mopping, troweling, or dipping. The substrate being coated, adhered to, or sealed can be of any shape including, for example, a flat or rolled sheet (e.g., cylinder), sphere, beads, finely divided particles, and the like. The surface of the substrate being coated, adhered to, or sealed can be irregular or regular, continuous or discontinuous, porous or non-porous, jointed or not jointed.

The substrates suitable for being adhered to, coated, or sealed independently can comprise any material. Examples of suitable material are wood, metal, ceramic, plastic, and glass.

The adhesive article comprises adhered substrates, the adhered substrates comprising the inventive crosslinked composition disposed between and in adhering operative contact to at least portions of two substrates. The two substrates are the same or different.

The coated article comprises a coated substrate comprising a layer of the inventive crosslinked composition in coating operative contact to at least a portion of a substrate.

The sealed article comprises a sealed substrate comprising a layer of the inventive crosslinked composition in sealing operative contact to at least a portion of a substrate.

Preferably, the crosslinkable compositions are provided in a kit.

EXAMPLES

The following examples illustrate the present invention but are not intended to limit the scope of the invention.
Formulation Compontents:

Polyol 1 is an acrylic polyol, available under the tradename Desmophene A365 from Bayer, having a 65% solid content in 3:1 butylacetate/xylene, and a Hydroxyl No. 92 mg KOH per g, equivalent weight of 586 g/mol, and 2.9 percent OH by weight.

Polyol 2 is an acrylic polyol comprising 25% HEMA; 28% IDMA; 12% EHMA; 35% tBMA Hydroxyl No. of solution: 56.2 mg KOH/g; 998 eq g/mol, wherein said Polyol 2 has a number average molecular weight ($M_n$) 2180 g/mole; weight average molecular weight ($M_w$) 3590 g/mole; Dispersity of D=1.65; percent solid of approximately 49 percent; a calculated Hydroxyl No. of 131.02 mg KOH per g.

Polyol 3 is short oil alkyd resin based on coconut oil available under the tradename DURAMAC™ 52-5205 from PCCR USA Incorporated, having a 60% solid content in xylene, and a Hydroxyl No. 175 mg KOH per g (on solids), equivalent weight of 321 g/mol (on solids). Polyol 3 has a mono-ol content of approximately 66%, and 1,3-diol content of 34%.

Polyol 4 is a polyester alkyd (medium oil alkyd based) having a 72% solid content in xylene, and a Hydroxyl No. 101 mg KOH per g, equivalent weight of approximately 556 g/mol. Polyol 4 has a mono-ol content of approximately 25%, and 1,3-diol content of 75%.

CHDA (Aldehyde component) is approximately a 1:1 1,3 cyclohexanedicarboxaldehyde and 1,4-cyclohexanedicarboxaldehyde, having a weight average molecular weight ($M_w$) of 140.1 g/mol, and an equivalent weight (EW) of 70.05 equi g/mol.

Acid Catalyst 1 comprises: 1% DDBSA (dodecylbenzene sulfonic acid) solution; 0.15 g DDBSA, and 14.85 g MEK (methyl ethyl ketone).

Acid Catalyst 2 comprises: 25% p-toluenesulfonic acid (PTSA) solution; 1 g PTSA; and 3 g MEK (methyl ethyl ketone).

Substrate comprised a steel metal sheet (Act Test Panels) having the following dimensions: Cold Roll Steel 4 in.×12 in.×0.032 in. and polished and clean.

The costing compositions were applied to the substrate using a doctor blade having a gap of 5 mil.

Inventive Composition 1

Inventive composition 1 comprises (a) 5.0 g of Polyol 1; (b) 0.3 g of CHDA; (c) 1.1 g Acid Catalyst 1; and (d) 2 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Comparative Composition A

Comparative composition A comprises (a) 5.0 g of Polyol 1; (b) 0.9 g Acid Catalyst 1; and (c) 2 g of MEK (methyl ethyl ketone). Components a and c were placed in a flask, and mixed using a speed mixer to form a clear solution, and subsequently component b was added, and mixed via the speed mixer at approximately 22 deg. C for approximately one minute.

Inventive Coated Sample 1 and Comparative Coated Sample A

Inventive composition 1 and comparative composition A were applied to a substrate (metal) via a doctor blade having a gap of 5 mil, and then allowed to air dry for 24 hours and then heat treated at 140° C. for half an hour to form a single layer Inventive Coated Sample 1 and Comparative Coated Sample A, respectively. Various standard properties of the Coated Sample 1 and Comparative Coated Sample A were tested and reported in Table 1.

TABLE 1

|  | Inventive Coated Sample 1 | Comaprative Coated Sample A |
|---|---|---|
| Film Thickness (mil) | 1.04 | 0.93 |
| Pendulum Hardness (Konig, sec) | 124 | 58 |
| 20° Gloss (GU) | 95.7 | 99.7 |
| 60° Gloss (GU) | 110.4 | 110.3 |
| MEK Resistance (hammer, double rubs) | 30 | 5 |
| Pencil Hardness (gouge) | HB | 3B |
| *Water Resistance (After 7 Days Dry) |  |  |
| 1 day (24 h) water spot, Jun. 27, 2009 | 6 | 3 |
| Impact Resistance (direct, in · lbs) | 20 | 20 |
| Cross-hatch Adhesion (5B good-0B bad) | 4B | 3B |

Inventive Composition 2

Inventive composition 2 comprises (a) 6.0 g of Polyol 1; (b) 0.09 g of CHDA; (c) 1.2 g Acid Catalyst 1; and (d) 1 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Comparative Example B

Comparative composition 5 comprises (a) 6.0 g of Polyol 1; (b) 0.9 g Acid Catalyst 1; and (c) 1 g of MEK (methyl ethyl ketone). Components a and c were placed in a flask, and mixed using a speed mixer to form a clear solution, and subsequently component b was added, and mixed via the speed mixer at approximately 22 deg. C for approximately one minute.

Inventive Coated Sample 2 and Comparative Coated Sample B

Inventive composition 2 and comparative composition B were applied to a substrate (metal) via a doctor blade having a gap of 5 mil, and then allowed to air dry for 24 hours and then heat treated at 40 deg. C. or 120 deg. C. for half an hour to form Inventive Coated Sample 2(i), Inventive Coated Sample 2(ii), Comparative Coated Sample B(i), and Comparative Coated Sample B(ii), respectively. Various standard properties of the Inventive Coated Sample 2(i), Inventive Coated Sample 2(ii), Comparative Coated Sample B(i), and Comparative Coated Sample B(ii) were tested and reported in Table 2.

TABLE 2

| | Inventive Coated Sample 2(i) | Inventive Coated Sample 2(ii) | Comparative Coated Sample B(i) | Comparative Coated Sample B(ii) |
|---|---|---|---|---|
| Film Thickness (mil) | 1.57 | 1.40 | 1.12 | 1.40 |
| Pendulum Hardness (Konig, sec) | 62 | 87 | 47 | 48 |
| 20° Gloss (GU) | 99.8 | 94.9 | 100.7 | 93.9 |
| 60° Gloss (GU) | 111.4 | 109.8 | 110.4 | 106.4 |
| MEK Resistance (hammer, double rubs) | 15 | 15 | 5 | 5 |
| Pencil Hardness (gouge) | 2B | B | 2B | 2B |
| *Water Resistance (After 7 Days Dry) | | | | |
| 1 day (24 h) water spot, Jul. 08, 2009 | 4 | 4 | 3 | 3 |
| Impact Resistance (direct, in · lbs) | <20 | <20 | <20 | <20 |
| Cross-hatch Adhesion (5B good-0B bad) | 0B | 0B | 3B | 3B |

Inventive Composition 3

Inventive composition 3 comprises (a) 10.0 g of Polyol 4; (b) 0.63 g of CHDA; (c) 0.425 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Inventive Composition 4

Inventive composition 4 comprises (a) 10.0 g of Polyol 3; (b) 0.65 g of CHDA; (c) 0.426 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Inventive Composition 5

Inventive composition 5 comprises (a) 10.0 g of Polyol 4; (b) 0.95 g of CHDA; (c) 0.438 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Inventive Composition 6

Inventive composition 6 comprises (a) 10.0 g of Polyol 3; (b) 0.98 g of CHDA; (c) 0.439 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Inventive Composition 7

Inventive composition 7 comprises (a) 10.0 g of Polyol 4; (b) 1.26 g of CHDA; (c) 0.450 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Inventive Composition 8

Inventive composition 8 comprises (a) 10.0 g of Polyol 3; (b) 1.31 g of CHDA; (c) 0.452 g Acid Catalyst 2; and (d) 8 g of MEK (methyl ethyl ketone). Components a, b and d were placed in a flask, and mixed using a speed mixer to form a clear solution, and subsequently component c was added, and mixed via the speed mixer at approximately 22 deg. C for approximately one minute.

Comparative Composition C

Comparative composition C comprises (a) 10.0 g of Polyol 4; (b) 0.425 g Acid Catalyst 2; and (c) 8 g of MEK (methyl ethyl ketone). Components a and c were placed in a flask, and mixed using a speed mixer to form a clear solution, and subsequently component b was added, and mixed via the speed mixer at approximately 22 deg. C for approximately one minute.

Comparative Composition D

Comparative composition D comprises (a) 10.0 g of Polyol 3; (b) 0.426 g Acid Catalyst 2; and (c) 8 g of MEK (methyl ethyl ketone). Components a and c were placed in a flask, and mixed using a speed mixer to form a clear solution, and subsequently component b was added, and mixed via the speed mixer at approximately 22 deg. C for approximately one minute.

Inventive Coated Samples 3-8

Inventive compositions 3-8 were each applied to a substrate (metal) via a doctor blade having a gap of 5 mil, and then allowed to air dry for 7 days to form Inventive Coated Samples 3-8, respectively. Various standard properties of the Inventive Coated Samples 3-8 were tested and reported in Tables 3.

Comparative Coated Samples C-D

Comparative compositions C and D were each applied to a substrate (metal) via a doctor blade having a gap of 5 mil, and then allowed to air dry for 7 days to form Comparative Coated Samples C-D, respectively. Various standard properties of the Comparative Coated Samples C-D were tested and reported in Tables 3.

Thickness of the coating: ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

Hydroxyl number: Determined by following ASTM D4274-05 (Standard Test Methods for Testing Polyurethane Raw Materials: Determination of Hydroxyl Numbers of Polyols (2005)) and is expressed as number of milligrams of potassium hydroxide (KOH) per gram of test substance (mg KOH/g).

TABLE 3

| | Inventive Coated Sample 3 | Inventive Coated Sample 4 | Inventive Coated Sample 5 | Inventive Coated Sample 6 | Inventive Coated Sample 7 | Inventive Coated Sample 8 | Comparative Coated Sample C | Comparative Coated Sample D |
|---|---|---|---|---|---|---|---|---|
| Stoichiometry (CHO:OH) | 0.5:1 | | 0.75:1 | | 1:1 | | N/A | |
| p-Toluenesulfonic Acid (% solids) | 1 | 1 | 1 | 1 | 1 | 1 | 1 | 1 |
| Film Thickness (mil) | 1.97 | 1.38 | 1.90 | 1.30 | 1.68 | 1.30 | 1.68 | 1.13 |
| Pendulum Hardness (Konig, sec) | 84 | 28 | 98 | 29 | 118 | 27 | 47 | 6 |
| Pencil Hardness (gouge) | 3B | 5B | 2B | 5B | B | 5B | 5B | Fail |
| 20° Gloss (GU) | 107.32 | 110.88 | 108.18 | 113.26 | 110.08 | 114.24 | 111.38 | 112.68 |
| 60° Gloss (GU) | 120.98 | 119.94 | 119.06 | 122 | 120.68 | 121.5 | 118.34 | 118.44 |
| Cross-Hatch Adhesion | 5B | 4B | 3B | 4B | 4B | 5B | 0B* | 4B |
| Impact Resistance (direct, in · lbs) | 10 | 20 | 50 | 10 | 30 | 10 | <10 | 20 |
| *Water Resistance 24 h covered water spot test | 2 (rust) | 4 | 2 (rust) | 3 | 3 | 2 (rust) | 2 (rust) | 2 |
| Thickness for MEK Resistance | 1.96 | 1.39 | 1.76 | 1.16 | 1.52 | 1.46 | 1.64 | 1.08 |
| MEK Resistance | 1.97 | 1.28 | 1.84 | 1.24 | 1.76 | 1.18 | 1.68 | 1.24 |
| MEK Resistance (hammer, double rubs) | 100 | 15 | 115 | 15 | 150 | 15 | 55 | 10 |
| | 100 | 15 | 105 | 15 | 150 | 10 | 50 | 10 |
| Gel Fraction (%, 24 h, acetone) | 84 | 77 | 85 | 74 | 90 | 66 | 46 | 9 |
| Stains | Wood Substrate 7 Day Ambient Cure | | | | | | | |
| Skydrol | 4 | 3 | 4 | 3 | 4 | 3 | 2 | 1 |
| Windex | 5 | 4 | 5 | 3 | 5 | 4 | 3 | 3 |
| 50% Ethanol | 5 | 4 | 5 | 3 | 5 | 5 | 4 | 2 |
| water | 5 | 4 | 5 | 3 | 5 | 5 | 3 | 2 |

Test Methods

Test methods include the following:

Percent solids can be determined by following ASTM D2369-07 (Standard Test Method for Volatile Content of Coatings (2007)) except as follows. Determinations are done in triplicate. For each determination, weigh from 0.5 g to 0.7 g of sample of material to be tested into a tared aluminum pan and record weight to 0.1 mg accuracy. Cover sample with 3 mL toluene. Place pans into a preheated convection oven at 110° C. for 60 minutes, then reweigh to give weight of residual solids. Calculate percent solids based on weight of residual solids.

Alternatively, percent solids can be determined by thermogravimetric analysis (TGA) by placing 10 mg of sample into a standard thermogravimetric analysis unit that has a nitrogen gas purge. Heat the sample from 25° C. to 300° C. at a heating rate of 10° C. per minute (° C./min). From a graph of % weight loss as a function of time curve, use break in slope of the curve where the weight loss levels out as the percent (fraction of) solids.

Gloss: measurements are made with a BYK Labotron Gloss Unit following ASTM D523-08 (Standard Test Method for Specular Gloss (2008)).

Impact resistance: is determined by using a Gardner impact tester and following ASTM D2794-93 (Standard Test Method for Resistance of Organic Coatings to the Effects of Rapid Deformation (Impact) (1993)).

Abrasion resistance: using a Taber abrader (CS-17 wheels, 1000 g weights, 500 cycles).

Pendulum hardness: according to the Konig pendulum hardness test by following ANSI ISO1522 (Pendulum damping test).

Pencil hardness: ASTM D3363-05 (Standard Test Method for Film Hardness by Pencil Test (2005)) Pencil Lead-soft 6B, 5B, 4B, 3B, 2B, B, HB, F, H, 2H, 3H, 4H, 5H, 6H hard.

Acid etch resistance: Determined by placing drops of a 10% solution of $H_2SO_4$ on a surface of a coating, waiting for 2 hours, observing visual effect on the coating and categorizing the visual effect as either no effect, moderate etch, or severe etch. No effect means no change to coating surface, moderate etch means whitening of the coating surface, and severe etch means blistering of the coatings surface.

Water penetration resistance: (of a coating) Determined by placing drops of deionized water on a surface of a coating, covering the drops with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. Assign a relative rating of from 1 to 6, with 6 being highest water resistance and 1 being lowest water penetration resistance, characterized as follows:

1=Cut through, dissolves coating, cracks/peels away.
2=Water corrodes substrate.
3=Severe blushing, forms bubbles/wrinkles.
4=Mild blushing/yellowing, no change to tou
5=No effect, visible or otherwise.
6=No effect, never even blushed.

Solvent resistance or MEK test: (of a coating) Reported as the number of methyl ethyl ketone (MEK) back and forth rubs that are required to remove enough of the coating down to and thereby exposing the surface of the substrate.

Solubility of the polyaldehyde in water: ASTM E1148-02 (Standard Test Method for Measurements of Aqueous Solubility (2002)).

Cross-hatch adhesion: ASTM D3359-09 (Standard Test Methods for Measuring Adhesion by Tape Test) (scale 0B to 5B with 5B being the best adhesion).

Stain resistance: (of the coating) R is determined by placing drops of the insult material (water, 50% ethanol/water, skydrol, and windex) onto a piece of absorbent paper that is in direct contact with the coating surface, covering the thoroughly wetted paper with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. Assign a relative rating of from 1 to 6, with 6 being the most severe damage and 1 being lowest with no affect to the coating, characterized as follows:

1=Cut through, dissolves coating, cracks/peels away.
2=Water corrodes substrate.
3=Severe blushing, forms bubbles/wrink
4=Mild blushing/yellowing, no change tc
5=No effect, visible or otherwise.
6=No effect, never even blushed.

Gel Fraction: (of the coating material) Reported as the % of a film sample that remains after 24 hours of exposing a polymer film in a Soxlet extractor with refluxing acetone. A film sample is prepared using the same formulation as the coating and is pored into an aluminum foil boat to make a dried coating thickness of ~0.1 mm. The cured film is pealed from the foil and ~1 g of film is placed into a Soxhlet extractor thimble and an accurate weight is recorded. The thimble/film sample is paced into a Soxhlet extractor using acetone as the refluxing solvent. The sample is extracted for 24 hours using the refluxing acetone. The thimble/film sample is removed, allowed to dry overnight and weighed. The percent of material remaining after the extraction is calculated.

The present invention may be embodied in other forms without departing from the spirit and the essential attributes thereof, and, accordingly, reference should be made to the appended claims, rather than to the foregoing specification, as indicating the scope of the invention.

We claim:

1. A non-aqueous single phase crosslinkable composition comprising:
   a. a polyol having an average of 2 or more hydroxyl functional groups, and wherein the polyol comprises hydroxyl groups in a 1,2 or 1,3 configuration and wherein the polyol is an acrylic, styrene-acrylic, styrene-butadiene, saturated polyester, urethane, alkyd, polyether or polycarbonate;
   b. a polyaldehyde, or acetal or hemiacetal thereof; and
   c. an acid catalyst having pKa of less than 6; and
   d. optionally one or more organic solvents.

2. The crosslinkable composition of claim 1, wherein said crosslinkable composition is capable of reacting to cure at a temperature of from 0° C. to less than 120° C. to form a crosslinked composition.

3. The crosslinkable composition of claim 1, wherein the polyol comprises one or more additional crosslinking functional groups.

4. The crosslinkable composition of claim 3, wherein the one or more additional crosslinking functional groups are capable of being crosslinked with the polyaldehyde.

5. The crosslinkable composition of claim 1, wherein the polyaldehyde has from 2 to 20 carbon atoms.

6. The crosslinkable composition of claim 1, wherein the polyaldehyde, acetal, or hemiacetal thereof has greater than 20 carbon atoms, with the proviso that the polyaldehyde, acetal, or hemiacetal thereof has at least one aldehyde group for at least every 10 carbon atoms.

7. The crosslinkable composition of claim 1, wherein the polyaldehyde is selected from the group consisting of (cis, trans)-1,4-cyclohexanedicarboxyaldehydes, (cis,trans)-1,3-cyclohexanedicarboxyaldehydes, pentane-1,5-dial, ethane-1, 2-dial, and mixtures thereof.

8. The crosslinkable composition of claim 1, wherein the acid catalyst has a pKa of less than 4.0.

9. The crosslinkable composition of claim 1, wherein the acid catalyst has a pKa of less than 2.0.

10. The crosslinkable composition of claim 1, wherein the acid catalyst is a Lewis acid.

11. The crosslinkable composition of claim 1, wherein the acid catalyst is a functional group on the backbone of the polyol.

12. A composition comprising the crosslinkable composition of claim 1 and a curing inhibitor comprising alcohol and/or water, wherein the composition comprises equal to or less than 20 wt % water based on the total weight of solids in the composition.

13. The composition of claim 12, wherein said alcohol is selected from the group consisting of ethanol, 1-propanol, 1-butanol, ethylene glycol monoalkyl ethers, diethylene glycol monoalkyl ethers, propylene glycol monoalkyl ethers and dipropylene glycol monoalkyl ethers.

14. A crosslinked composition comprising the crosslinking product of the crosslinkable composition of claim 1.

15. A coating layer comprising the crosslinked composition of claim 14.

16. An article comprising a substrate and one or more coating layers according to claim 15 associated at least with one or more surface of said substrate.

17. A non-aqueous single phase crosslinkable composition comprising:
   a. a polyol having an average of 2 or more hydroxyl functional groups;
   b. a polyaldehyde, or acetal or hemiacetal thereof having greater than 20 carbon atoms, with the proviso that the polyaldehyde, or acetal or hemiacetal thereof has at least one aldehyde group for at least every 10 carbon atoms; and c. an acid catalyst having $pK_a$ of less than 6; and d. optionally one or more organic solvents.

18. The crosslinkable composition of claim 17, wherein said crosslinkable composition is capable of reacting to cure at a temperature of from 0° C. to less than 120° C. to form a crosslinked composition.

19. The crosslinkable composition of claim 17, wherein the polyol is an acrylic, styrene-acrylic, styrene-butadiene, saturated polyester, urethane, alkyd, polyether or polycarbonate.

20. The crosslinkable composition of claim 17, wherein the polyol comprises one or more additional crosslinking functional groups.

21. The crosslinkable composition of claim 20, wherein the one or more additional crosslinking functional groups are capable of being crosslinked with the polyaldehyde.

22. The crosslinkable composition of claim 17, wherein the polyol comprises hydroxyl groups in a 1,2 or 1,3 configuration.

23. The crosslinkable composition of claim 17, wherein the polyaldehyde has from 2 to 20 carbon atoms.

24. The crosslinkable composition of claim 17, wherein the polyaldehyde has greater than 20 carbon atoms, with the proviso that a polyaldehyde having greater than 20 carbon atoms has at least one aldehyde group for at least every 10 carbon atoms.

25. The crosslinkable composition of claim 17, wherein the polyaldehyde is selected from the group consisting of (cis, trans)-1,4-cyclohexanedicarboxyaldehydes, (cis,trans)-1,3-cyclohexanedicarboxyaldehydes, pentane-1,5-dial, ethane-1,2-dial, and mixtures thereof.

26. The crosslinkable composition of claim 17, wherein the acid catalyst has a pKa of less than 4.0.

27. The crosslinkable composition of claim 17, wherein the acid catalyst has a pKa of less than 2.0.

28. The crosslinkable composition of claim 17, wherein the acid catalyst is a Lewis acid.

29. The crosslinkable composition of claim 17, wherein the acid catalyst is a functional group on the backbone of the polyol.

30. The crosslinkable composition of claim 17, wherein the acid catalyst is a functional group on the backbone of the polyol.

31. A composition comprising the crosslinkable composition of claim 17 further comprising a curing inhibitor comprising alcohol and/or water, wherein the composition comprises equal to or less than 20 wt % water based on the total weight of solids in the composition.

32. The composition of claim 31, wherein said alcohol is selected from the group consisting of ethanol, 1-propanol, 1-butanol, ethylene glycol monoalkyl ethers, diethylene glycol monoalkyl ethers, propylene glycol monoalkyl ethers and dipropylene glycol monoalkyl ethers.

33. A crosslinked composition comprising the crosslinking product of the crosslinkable composition of claim 17.

34. A coating layer comprising the crosslinked composition of claim 33.

35. An article comprising a substrate and one or more coating layers according to claim 34 associated at least with one or more surface of said substrate.

36. A non-aqueous single phase crosslinkable composition comprising:

a. a polyol having an average of 2 or more hydroxyl functional groups;

b. a polyaldehyde, or acetal or hemiacetal thereof; and c. an acid catalyst having $pK_a$ of less than 6, wherein the acid catalyst is a functional group on the backbone of the polyol; and d. optionally one or more organic solvents.

37. The crosslinkable composition of claim 36, wherein said crosslinkable composition is capable of reacting to cure at a temperature of from 0° C. to less than 120° C. to form a crosslinked composition.

38. The crosslinkable composition of claim 36, wherein the polyol is an acrylic, styrene-acrylic, styrene-butadiene, saturated polyester, urethane, alkyd, polyether or pOlycarbonate.

39. The crosslinkable composition of claim 36, wherein the polyol comprises one or more additional crosslinking functional groups.

40. The crosslinkable composition of claim 36, wherein the one or more additional crosslinking functional groups are capable of being crosslinked with the polyaldehyde.

41. The crosslinkable composition of claim 36, wherein the polyol comprises hydroxyl groups in a 1,2 or 1,3 configuration.

42. The crosslinkable composition of claim 36, wherein the polyaldehyde has from 2 to 20 carbon atoms.

43. The crosslinkable composition of claim 36, wherein the polyaldehyde has greater than 20 carbon atoms, with the proviso that a polyaldehyde having greater than 20 carbon atoms has at least one aldehyde group for at least every 10 carbon atoms.

44. The crosslinkable composition of claim 36, wherein the polyaldehyde is selected from the group consisting of (cis, trans)-1,4-cyclohexanedicarboxyaldehydes, (cis,trans)-1,3-cyclohexanedicarboxyaldehydes, pentane-1,5-dial, ethane-1,2-dial, and mixtures thereof.

45. The crosslinkable composition of claim 36, wherein the acid catalyst has a pKa of less than 4.0.

46. The crosslinkable composition of claim 36, wherein the acid catalyst has a pKa of less than 2.0.

47. The crosslinkable composition of claim 36, wherein the acid catalyst is a Lewis acid.

48. A composition comprising the crosslinkable composition of claim 36 further comprising a curing inhibitor comprising alcohol and/or water, wherein the composition comprises equal to or less than 20 wt % water based on the total weight of solids in the composition.

49. The composition of claim 48, wherein said alcohol is selected from the group consisting of ethanol, 1-propanol, 1-butanol, ethylene glycol monoalkyl ethers, diethylene glycol monoalkyl ethers, propylene glycol monoalkyl ethers and dipropylene glycol monoalkyl ethers.

50. A crosslinked composition comprising the crosslinking product of the crosslinkable composition of claim 36.

51. A coating layer comprising the crosslinked composition of claim 50.

52. An article comprising a substrate and one or more coating layers according to claim 51 associated at least with one or more surface of said substrate.

* * * * *